United States Patent
Goel et al.

(10) Patent No.: US 11,816,103 B1
(45) Date of Patent: Nov. 14, 2023

(54) DYNAMIC PREFETCHING FOR DATABASE QUERIES

(71) Applicant: Amazon Technologies, Inc., Seattle, WA (US)

(72) Inventors: Niket Goel, Seattle, WA (US); Gopi Krishna Attaluri, Cupertino, CA (US); Kamal Kant Gupta, Snoqualmie, WA (US); Tengiz Kharatishvili, Sammamish, WA (US); Stefano Stefani, Issaquah, WA (US); Alexandre Olegovich Verbitski, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 15/909,886

(22) Filed: Mar. 1, 2018

(51) Int. Cl.
*G06F 16/245* (2019.01)
*G06F 16/2453* (2019.01)
*G06F 16/22* (2019.01)

(52) U.S. Cl.
CPC .... *G06F 16/24534* (2019.01); *G06F 16/2246* (2019.01)

(58) Field of Classification Search
None
See application file for complete search history.

(56) References Cited

U.S. PATENT DOCUMENTS

| | | |
|---|---|---|
| 5,799,309 A | 8/1998 | Srinivasan |
| 6,772,179 B2 | 8/2004 | Chen et al. |
| 6,829,680 B1 | 12/2004 | Sugumar et al. |
| 6,848,028 B1 | 1/2005 | Sugumar et al. |
| 7,284,014 B2 | 10/2007 | Idei et al. |
| 7,359,890 B1 * | 4/2008 | Ku ................... G06F 16/24552 |
| 2004/0128449 A1 * | 7/2004 | Osborne ............. G06F 13/4243 711/137 |
| 2005/0125608 A1 * | 6/2005 | Grimsrud .............. G06F 3/0676 711/113 |
| 2006/0224860 A1 * | 10/2006 | Colavin ................. G06F 9/383 712/207 |
| 2009/0199190 A1 * | 8/2009 | Chen ...................... G06F 9/383 718/102 |
| 2011/0173397 A1 * | 7/2011 | Boyle ................. G06F 12/0862 711/137 |
| 2011/0258179 A1 * | 10/2011 | Weissman ......... G06F 16/24537 707/713 |
| 2014/0188893 A1 * | 7/2014 | Kobayashi .......... G06F 16/9014 707/747 |
| 2017/0208125 A1 * | 7/2017 | Jai ......................... G06F 3/0608 |

FOREIGN PATENT DOCUMENTS

WO    WO-2012087366 A1 *   6/2012   ........... G06F 16/242

* cited by examiner

*Primary Examiner* — Alford W Kindred
*Assistant Examiner* — Cao D Vuong
(74) *Attorney, Agent, or Firm* — Robert C. Kowert; Kowert, Hood, Munyon, Rankin & Goetzel, P.C.

(57) ABSTRACT

Methods, systems, and computer-readable media for dynamic prefetching for database queries are disclosed. A query of a database is started according to a first prefetch policy. Before completing the query, the first prefetch policy is changed to a second prefetch policy. A portion of the query is performed according to the second prefetch policy.

20 Claims, 7 Drawing Sheets

DYNAMIC PREFETCHING FOR DATABASE QUERIES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
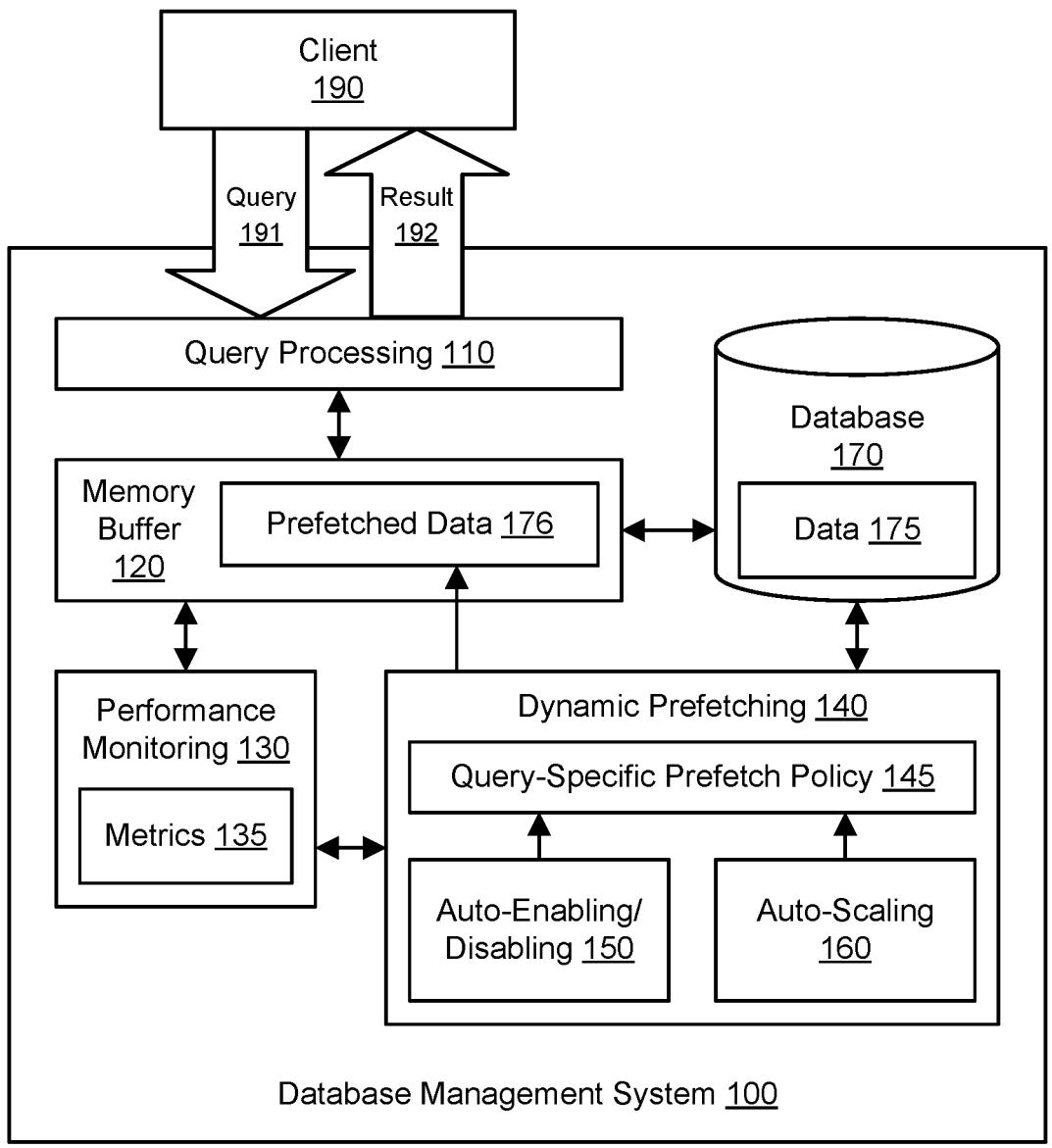
FIG. 1 illustrates an example system environment for dynamic prefetching for database queries, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for dynamic prefetching for database queries are described. In one embodiment, a database system may perform prefetching of database elements in order to improve the time to process queries. In one embodiment, for example, to process a query representing a join on two tables, rows from the first table may be retrieved first, and those keys from those rows may be used to prefetch rows from the second table before the query requires access to the data from the second table. In one embodiment, prefetch policies may be automatically changed in the middle of query processing to optimize system performance and use of system resources. In one embodiment, prefetch resources such as threads and data structures may be auto-scaled for particular queries in order to increase or decrease the amount of prefetching. In one embodiment, prefetching may be automatically enabled or disabled for particular queries or tables. In one embodiment, prefetch policies may be modified based (at least in part) on analysis of system metrics. In one embodiment, a metric may be determined that indicates the warmness of a memory buffer with respect to a particular table, and a prefetch policy may be changed for that particular table and for a particular query based (at least in part) on the metric. In some embodiments, for example, prefetching for a table may be enabled or scaled up if the amount of the table's elements in the buffer is below a threshold percentage, or prefetching for the table may be disabled or scaled down if the amount of the table's elements in the buffer is above a threshold percentage. In one embodiment, prefetched elements may represent pages of an index that are retrieved from a B-tree data structure. In some embodiments, dynamic prefetching may be performed for queries such as joins and non-covering index reads. In one embodiment, prefetch requests may be prioritized. In one embodiment, prefetch requests may be prioritized based (at least in part) on the age of requests, e.g., such that older requests for the same table and the same query may be discarded while newer requests may be prefetched. In various embodiments, dynamic prefetching for database queries as described herein may be used to improve the speed of query processing while optimizing the use of computing resources and memory resources.

FIG. 1 illustrates an example system environment for dynamic prefetching for database queries, according to one embodiment. In one embodiment, a database management system 100 may provide access to a database 170 for one or more clients, such as client 190. In one embodiment, the database management system 100 may receive queries from clients, implement or perform the queries using data 175 stored in the database 170 using a query processing component 110, and return results of at least some of the queries. In one embodiment, for example, the client 190 may provide a query 191 to the query processing component 110, and the query processing component may return a result 192 upon performing the query. In one embodiment, the query may be expressed in a formal language such as Structured Query Language (SQL). In one embodiment, the query may represent an inquiry into the database 170, e.g., to return selected data elements stored in the database. In one embodiment, the database management system 100 may represent a relational database management system, and the database 170 may be structured to represent relationship among elements of the data 175, e.g., by expressing at least some of the data in the form of tables with rows and columns. In one embodiment, at least some of the tables may be indexed. In one embodiment, an index may represent a copy of one or more particular columns of data from a table, such as columns that contain keys, and such that the index that can be searched efficiently for retrieval of the corresponding row(s) of data.

In one embodiment, the database management system 100 may include a memory buffer 120 that is accessible by the query processing component 110 to facilitate and expedite the processing of queries. In one embodiment, the buffer 120 may represent a low-latency memory buffer or cache memory for the query processing component 110. In one embodiment, the buffer 120 may store elements of data 175 retrieved from the database 170 and potentially required to perform queries. In one embodiment, the buffer 120 may store elements of prefetched data 176, where the prefetched data is retrieved from the database before the query processing 110 necessarily requires the data. In one embodiment, if data needed by a query is not prefetched, then the data may be retrieved from the database 170 only when the query processing encounters a need for the data. In one embodiment, prefetching of selected elements of the data 175 may permit queries to be completed more quickly by reducing the amount of wait time for the data to be retrieved. In one embodiment, prefetching may be performed dynamically, selectively, and asynchronously, so that input/output (I/O) bandwidth in the system 100 is optimized while query processing 110 is expedited.

In one embodiment, the database management system 100 may include a dynamic prefetching component 140 that implements dynamic, selective, and asynchronous prefetching. In one embodiment, using the dynamic prefetching component 140, selected elements of data 176 may be prefetched for use in query processing 110 on a query-by-query basis. In one embodiment, using the dynamic prefetching component 140, selected elements of data 176 may be prefetched for use in query processing 110 on a table-by-table or index-by-index basis for a particular query. In one embodiment, the dynamic prefetching 140 may be adapted and reconfigured based (at least in part) on changing conditions in the database management system 100. In one embodiment, the dynamic prefetching component 140 may generate, maintain, and/or modify prefetch policy 145 that is specific to a particular query such as query 191. In one embodiment, the prefetch policy 145 may be determined based (at least in part) on a component 150 for automatic enabling or disabling of prefetching. In one embodiment, the prefetch policy 145 may be determined based (at least in part) on a component 160 for automatic scaling of resources used for prefetching. In one embodiment, auto-scaling may include increasing or decreasing the amount of resources available for prefetching such that the amount or scope of prefetching is increased or decreased. In one embodiment, the prefetch policy 145 may be dynamically modified during the processing of a query 191, such that a latter portion of the query is performed according to a different prefetch policy that an earlier portion of the query In some embodiments, prefetching may be automatically disabled for particular types of queries, e.g., queries for which prefetching is not expected to improve performance, and/or automatically enabled for other types of queries. In one embodiment, prefetching may be performed for a query representing an operation that reads a non-covering index (e.g., an index that cannot satisfy all requested columns in a query without performing a further lookup into the clustered index). In one embodiment, prefetching may be performed for a query representing a join on two or more tables, such that the output of the join may depend on rows or keys that are read for the first of the tables. In one embodiment, starting the query may include reading rows, keys, or other elements of data from a first table (or index) according to a first prefetch policy. In one embodiment, the retrieved data may be stored in the memory buffer 120 of the database management system 100, where the memory buffer may provide low-latency access to data needed for queries. In one embodiment, retrieving data to start the query may include retrieving one or more pages of index data using a B-tree or other data structure. In one embodiment, the pages of index data may include rows or keys needed to process the query along with adjacent rows or keys that may not be needed at the present time but that may ultimately be used for other queries or other portions of the same query.

In one embodiment, the prefetch policy 145 may relate to a particular query 191 or to one or more tables, indexes, or other types of datasets associated with the query. In one embodiment, the prefetch policy 145 may indicate whether prefetching is enabled or disabled for a particular query 191 and/or a particular dataset. In one embodiment, the prefetch policy 145 may indicate an amount of threads, data structures, and/or other computational resources to be used for prefetching for a particular query 191 and/or a particular dataset. In one embodiment, the prefetch policy 145 may indicate a maximum number of prefetch requests to be pending at a given time, and requests in excess of that number may be discarded.

In one embodiment, the prefetch policy 145 may be determined based (at least in part) on analysis of system performance. In one embodiment, the database management system 100 may include a performance monitoring component 130. In one embodiment, the performance monitoring 130 may generate one or more metrics 135. In one embodiment, the metrics 135 may describe or capture aspects of system performance in the database management system 100. In one embodiment, at least some of the metrics 135 may relate to the effectiveness of prefetching into the memory buffer 120. In one embodiment, a metric may be determined that indicates the warmness of the memory buffer 120 with respect to a particular table (or index), and the prefetch policy 145 may be changed for that particular table and for the particular query based (at least in part) on the metric. In some embodiments, for example, prefetching for a table may be enabled or scaled up if the amount of the table's elements in the buffer is below a threshold percentage, or prefetching for the table may be disabled or scaled down if the amount of the table's elements in the buffer is above a threshold percentage. In one embodiment, the presence of index pages for a particular index in the memory buffer 120 may change throughout the processing of a query 191, e.g., as pages are pushed out by pages for other queries. In one embodiment, the prefetch policy 145 may be changed in response to probing the memory buffer 120 using the query 191 itself, e.g., to determine the extent to which data elements of a particular table are already present in the buffer. In one embodiment, for example, if the hit rate in the buffer for index pages is low, then prefetching may be enabled or scaled up for a latter portion of a query based (at least in part) on changes to the content of the memory buffer after the processing of the query was initiated. In one embodiment, by changing the prefetch policy 145 during the processing of a particular query 191, prefetching can be triggered selectively for some indexes and not for other indexes in order to optimize resource use.

In one embodiment, the prefetch policy 145 may be changed based (at least in part) on metrics 135 for system performance such as processor usage, memory usage, input/ output (I/O) latency, and so on. In one embodiment, for example, if system performance (as captured in one or more metrics 135) has decreased below an acceptable threshold after instituting a prefetch policy, then prefetching may be disabled or scaled down by changing the prefetch policy. In one embodiment, if memory buffer thrashing is detected, then prefetching may be disabled or scaled down by changing the prefetch policy. In one embodiment, if performance was improved by a change reflected in the prefetch policy, then that change may be further implemented in a modified prefetch policy. In one embodiment, for example, a performance improvement resulting from an increase in prefetch requests or prefetch threads in a prefetch policy may result in a further increase in prefetch requests or prefetch threads in a modified prefetch policy. In one embodiment, the prefetch policy may be changed based (at least in part) on a metric for the number or frequency of invalidations of older prefetch requests. In one embodiment, the prefetch policy may be changed based (at least in part) on a metric for the number or frequency of page misses on the query thread. In one embodiment, the prefetch policy may be changed based (at least in part) on a metric for the number or frequency of prefetch requests discarded due to resource constraints. In one embodiment, for example, the maximum number of prefetch requests may be decreased in response to a high number of discarded requests. In one embodiment, if metrics 135 show that prefetching is being performed frequently for pages that are already in the memory buffer, or for pages that are evicted from the buffer before the query can use them, then prefetching may be disabled or scaled down for that particular index.

In one embodiment, prefetched data 176 may include pages of index data retrieved using a B-tree or other data structure. In one embodiment, the pages of index data may include rows or keys needed to process the query 191 along with adjacent rows or keys that may not be needed at the present time but that may ultimately be used for other queries or other portions of the same query. In one embodiment, prefetched data 176 may be retrieved and stored in the buffer 120 before a specific need to use the data is encountered in processing the query. In one embodiment, for example, to perform a join on two tables, rows containing keys may be read from the first table (according to a prefetch policy), and those keys may be used to prefetch rows from the second table before the query processor performs the portion of the query statement that requires the data from the second table. In one embodiment, the prefetched rows may be available in memory 120 when the query processing 110 needs them, and thus the query 191 may be processed more quickly without the need to wait for additional I/O of data from the database 170.

In one embodiment, the database management system 100 may be implemented using resources of a provider network. In one embodiment, the provider network may represent a network set up by an entity such as a private-sector company or a public-sector organization to provide one or more services (such as various types of network-accessible computing or storage) accessible via the Internet and/or other networks to a distributed set of clients. In one embodiment, the provider network may include numerous services that collaborate according to a service-oriented architecture to provide resources such as the database 170. In one embodiment, the provider network may include numerous data centers hosting various resource pools, such as collections of physical and/or virtualized computer servers, storage devices, networking equipment and the like, that are used to implement and distribute the infrastructure and services offered by the provider. In one embodiment, compute resources may be offered to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In one embodiment, the database management system 100 may be implemented as a service of the provider network, the service may be implemented using a plurality of different instances that are distributed throughout one or more networks, and each instance may offer access to the functionality of the service to various clients. In one embodiment, because resources of the provider network may be under the control of multiple clients (or tenants) simultaneously, the provider network may be said to offer multi-tenancy and may be termed a multi-tenant provider network. In one embodiment, the functionality of the provider network, such as the query processing 110 with dynamic prefetching 140, may be offered to clients in exchange for fees.

Figure 7:
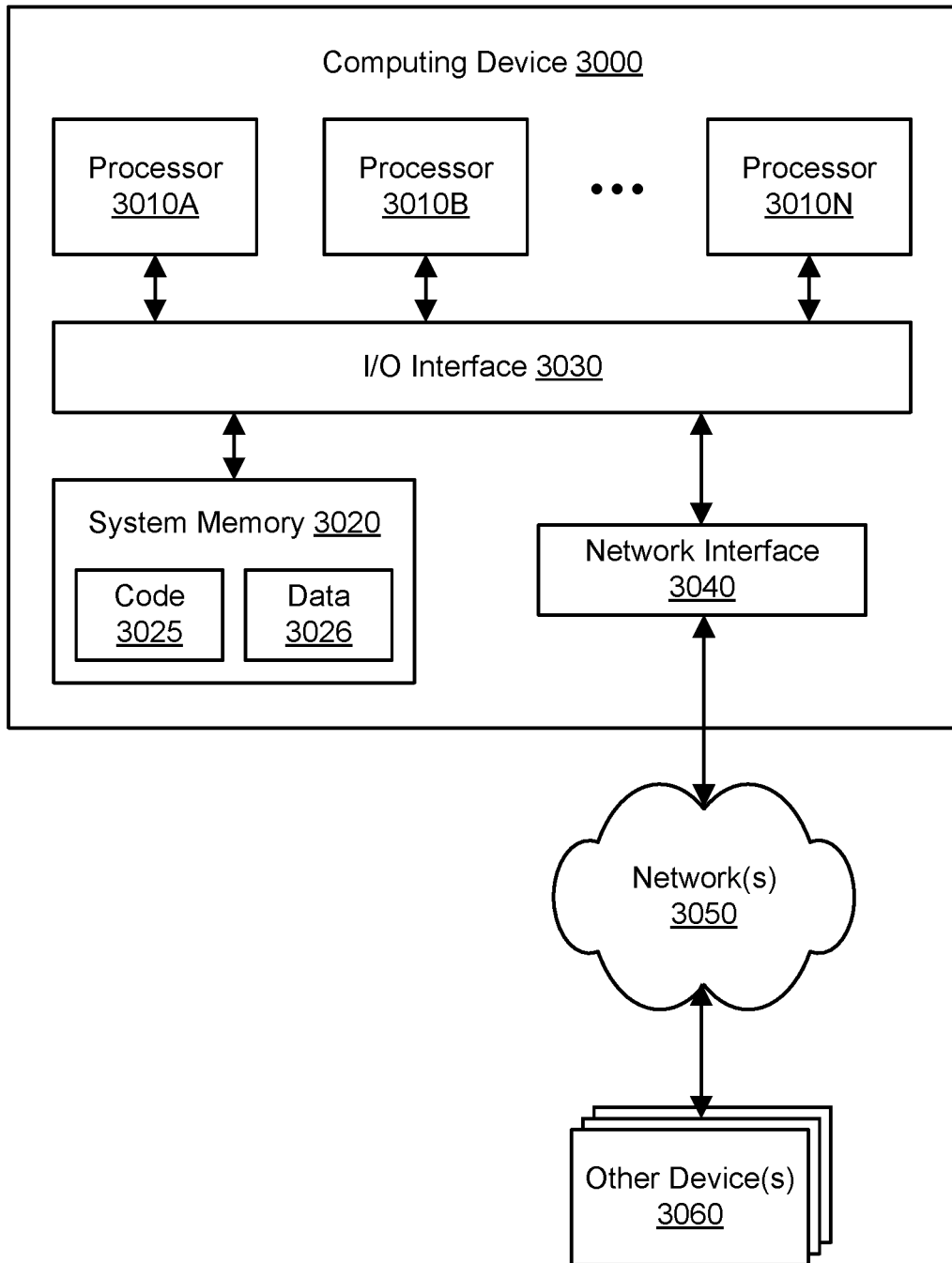
FIG. 7 illustrates an example computing device that may be used in some embodiments.

In one embodiment, the database management system 100 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the system 100 may be provided by the same computing device or by different computing devices. In various embodiments, if any of the components of the system 100 are implemented using different computing devices, then the components and their respective computing devices may be communicatively coupled, e.g., via one or more networks. In one embodiment, any of the components of the system 100 may represent any combination of software and hardware usable to perform their respective functions. In some embodiments, operations implemented by the system 100 may be performed automatically, e.g., without a need for user initiation or user intervention after an initial configuration stage, and/or programmatically, e.g., by execution of program instructions on at least one computing device. In some embodiments, the system 100 may include additional components not shown, fewer components than shown, or different combinations, configurations, or quantities of the components shown.

In one embodiment, clients of the system 100 (such as client 190) may represent external devices, systems, or entities with respect to the system. In one embodiment, the client device(s) may be implemented using any suitable number and configuration of computing devices, any of which may be implemented by the example computing device 3000 illustrated in FIG. 7. In one embodiment, clients may convey network-based service requests to the system 100 via one or more networks, e.g., to supply query statements or criteria for queries. In various embodiments, the network(s) may encompass any suitable combination of networking hardware and protocols necessary to establish network-based communications between client devices and the system 100. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both a given client device and the system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the service system. In one embodiment, client devices may communicate with the system 100 using a private network rather than the public Internet. In various embodiments, the various components of the system 100 may also communicate with other components of the system using one or more network interconnects.

In one embodiment, the client 190 may employ a user interface to interact with the query processing component 110 or other component of the system 100. In one embodiment, the user interface may include a graphical user interface (GUI), a command-line interface (CLI), and so on. In one embodiment, a client 190 (e.g., a user of a client computing device) may use the user interface to supply components of a query 191. In one embodiment, the client 190 may use the user interface to receive the result 192 of the query 191. In one embodiment, the user interface may communicate with the query processing component 110 using one or more application programming interfaces (APIs) and/or other programmatic interfaces. In one embodiment, software operated by the client 190 may provide the query 191 and receive the result 192 using one or more APIs and/or other programmatic interfaces.

Figure 2:
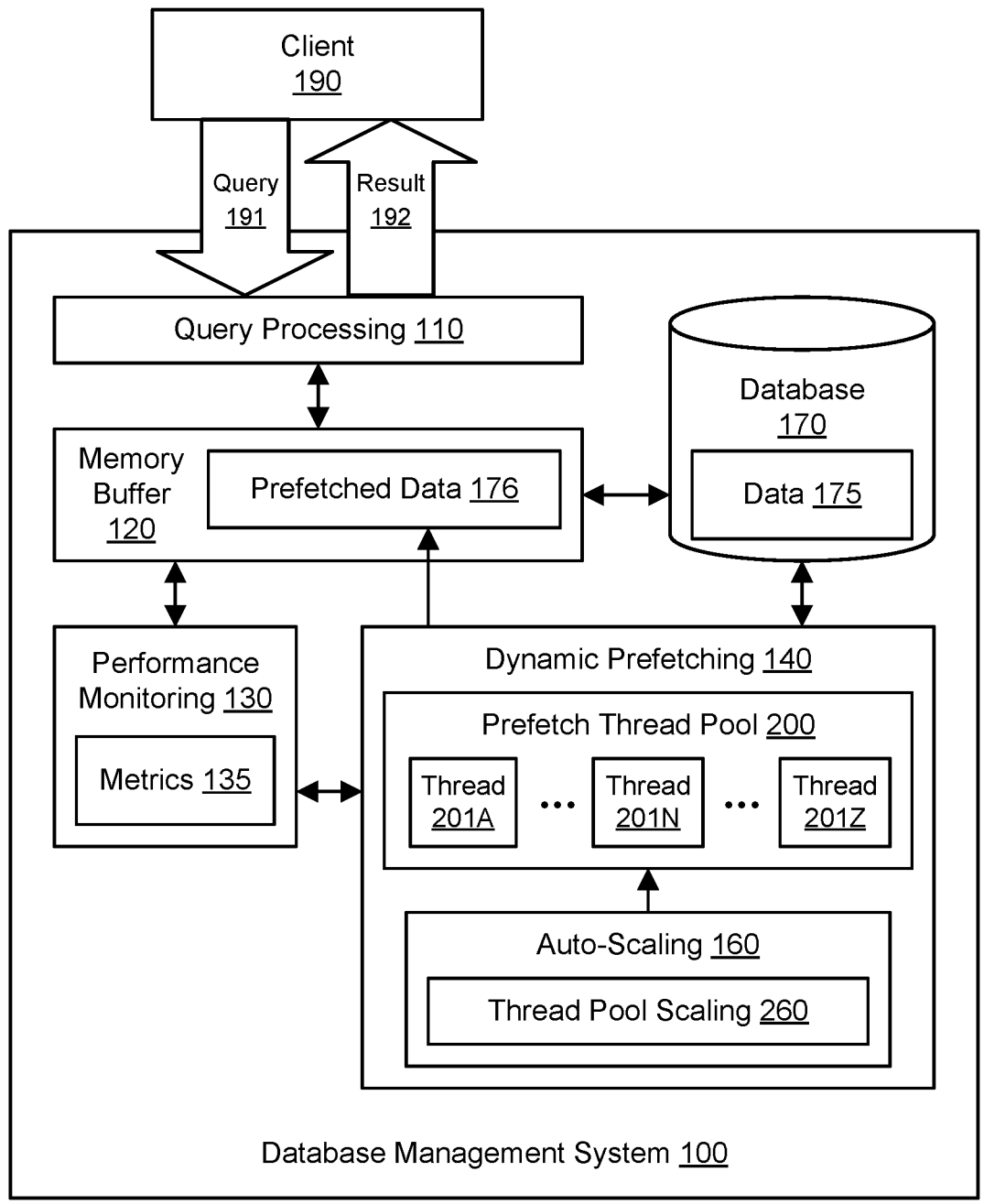
FIG. 2 illustrates further aspects of the example system environment for dynamic prefetching for database queries, including auto-scaling of a prefetch thread pool, according to one embodiment.

FIG. 2 illustrates further aspects of the example system environment for dynamic prefetching for database queries, including auto-scaling of a prefetch thread pool, according to one embodiment. In one embodiment, the dynamic prefetching component 140 may use a plurality of threads in a thread pool 200 to perform prefetching. In one embodiment, a thread may perform prefetching by interacting with the database 170 to retrieve elements of data 175 and then causing those elements to be stored in the memory buffer 120 as prefetched data 176. In one embodiment, for example, the prefetch thread pool 200 may include threads such as thread 201A through thread 201N through thread 201Z. In one embodiment, the threads 201A-201Z may operate in parallel to perform prefetching, and thus the amount of prefetched data may tend to increase as the number of threads increases. In one embodiment, auto-scaling 160 may include increasing or decreasing the amount of threads (or processes) available for prefetching such that the amount or scope of prefetching is increased or decreased. In one embodiment, the auto-scaling 160 may include a component for thread pool scaling 260 that periodically modifies the size of the thread pool 200 by increasing or decreasing the number of threads. In one embodiment, for example, scaling up the prefetching may include expanding the thread pool 200 from threads 201A-201N to threads 201A-201Z. In one embodiment, as another example, scaling down the prefetching may include contracting the thread pool 200 from threads 201A-201Z to threads 201A-201N. In one embodiment, the query-specific prefetch policy 145 may indicate the number of threads assigned to prefetching for a particular query, as determined by the thread pool scaling component 260.

In one embodiment, the thread pool scaling 260 may change the size of the thread pool after the start of query processing (for a particular query 191) and before the completion of query processing (for the particular query). In one embodiment, the thread pool scaling 260 may be responsive to changes in system metrics 135. In one embodiment, for example, the thread pool scaling 260 may decrease the number of prefetch threads if the metrics 215 indicate that prefetching has become a performance burden on the database management system 100. In one embodiment, a performance burden may be identified if CPU utilization exceeds a threshold after prefetching is enabled or scaled up or if thrashing is detected for the buffer 120. In one embodiment, as another example, the thread pool scaling 260 may increase the number of prefetch threads in the middle of query processing if the metrics 215 indicate that the buffer 120 contains a relatively low amount of data that the query 191 is anticipated to need in the future. In one embodiment, as yet another example, the thread pool scaling 260 may decrease the number of prefetch threads in the middle of query processing if the metrics 215 indicate that the buffer 120 already contains a relatively high amount of data that the query 191 is anticipated to need in the future.

Figure 3:
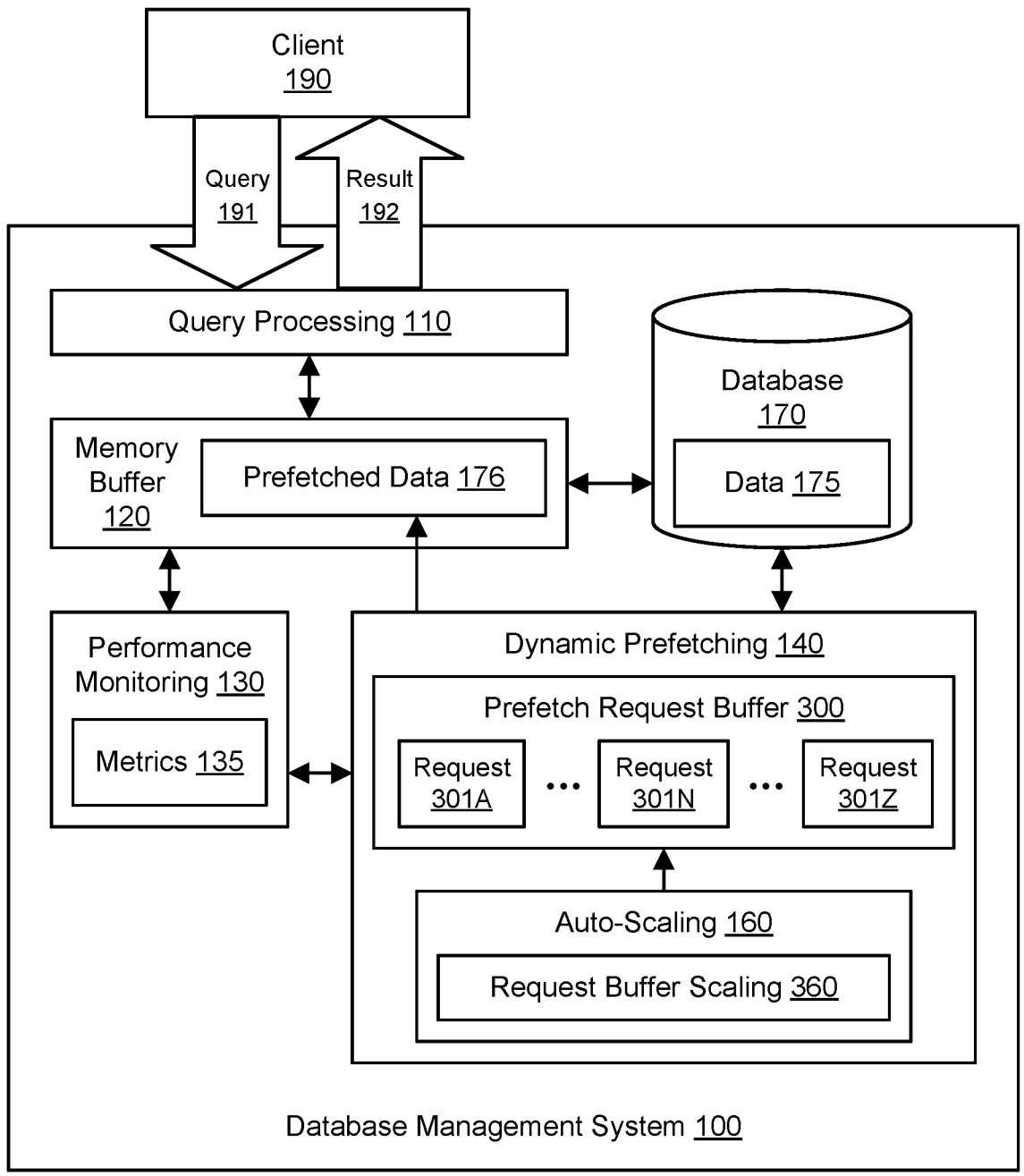
FIG. 3 illustrates further aspects of the example system environment for dynamic prefetching for database queries, including auto-scaling of a prefetch request buffer, according to one embodiment.

FIG. 3 illustrates further aspects of the example system environment for dynamic prefetching for database queries, including auto-scaling of a prefetch request buffer, according to one embodiment. In one embodiment, the dynamic prefetching component 140 may use a buffer 300 that stores prefetch requests such as request 301A through request 301N through request 301Z. In one embodiment, a prefetch request may represent an instruction to prefetch particular elements of data 175 on behalf of a client 190. In various embodiments, the prefetch request buffer 300 may represent a set of prefetch requests for one query or one client. In one embodiment, other prefetch request buffers may be used for other queries and/or other clients, and the dynamic prefetching may rotate through the various prefetch request buffers to ensure that one query or one client does not monopolize the prefetching. In one embodiment, the actual performance of prefetching in response to a particular prefetch request may not be guaranteed by the system 100, as prefetching may be deemed an optimization to the primary goal of query processing 110 but not a necessity.

In one embodiment, auto-scaling 160 may include increasing or decreasing the maximum number of prefetch requests that can be pending at a given time (as reflected in the size of the buffer 300) such that the amount or scope of prefetching is increased or decreased. In one embodiment the amount of prefetched data may tend to increase as the number of concurrent requests in the buffer 300 increases. In one embodiment, the auto-scaling 160 may include a component for request buffer scaling 360 that periodically modifies the size of the request buffer 300 by increasing or decreasing the maximum number of requests that can be pending at a given time. In one embodiment, for example, scaling up the prefetching may include expanding the request buffer 300 from holding requests 301A-301N to holding requests 301A-301Z. In one embodiment, as another example, scaling down the prefetching may include contracting the request buffer 300 from holding requests 301A-301Z to holding requests 301A-301N. In one embodiment, the query-specific prefetch policy 145 may indicate the maximum number of pending prefetch requests for a particular query, as determined by the request buffer scaling component 360.

In one embodiment, the request buffer scaling 360 may change the size of the request buffer 300 after the start of query processing (for a particular query 191) and before the completion of query processing (for the particular query). In one embodiment, the request buffer scaling 360 may be responsive to changes in system metrics 135. In one embodiment, for example, the request buffer scaling 360 may decrease the maximum number of prefetch requests if the metrics 215 indicate that prefetching has become a performance burden on the database management system 100. In one embodiment, a performance burden may be identified if CPU utilization exceeds a threshold after prefetching is enabled or scaled up or if thrashing is detected for the buffer 120. In one embodiment, as another example, the request buffer scaling 360 may increase the maximum number of prefetch requests in the middle of query processing if the metrics 215 indicate that the buffer 120 contains a relatively low amount of data that the query 191 is anticipated to need in the future. In one embodiment, as yet another example, the request buffer scaling 360 may decrease the maximum number of prefetch requests in the middle of query processing if the metrics 215 indicate that the buffer 120 already contains a relatively high amount of data that the query 191 is anticipated to need in the future.

Figure 4:
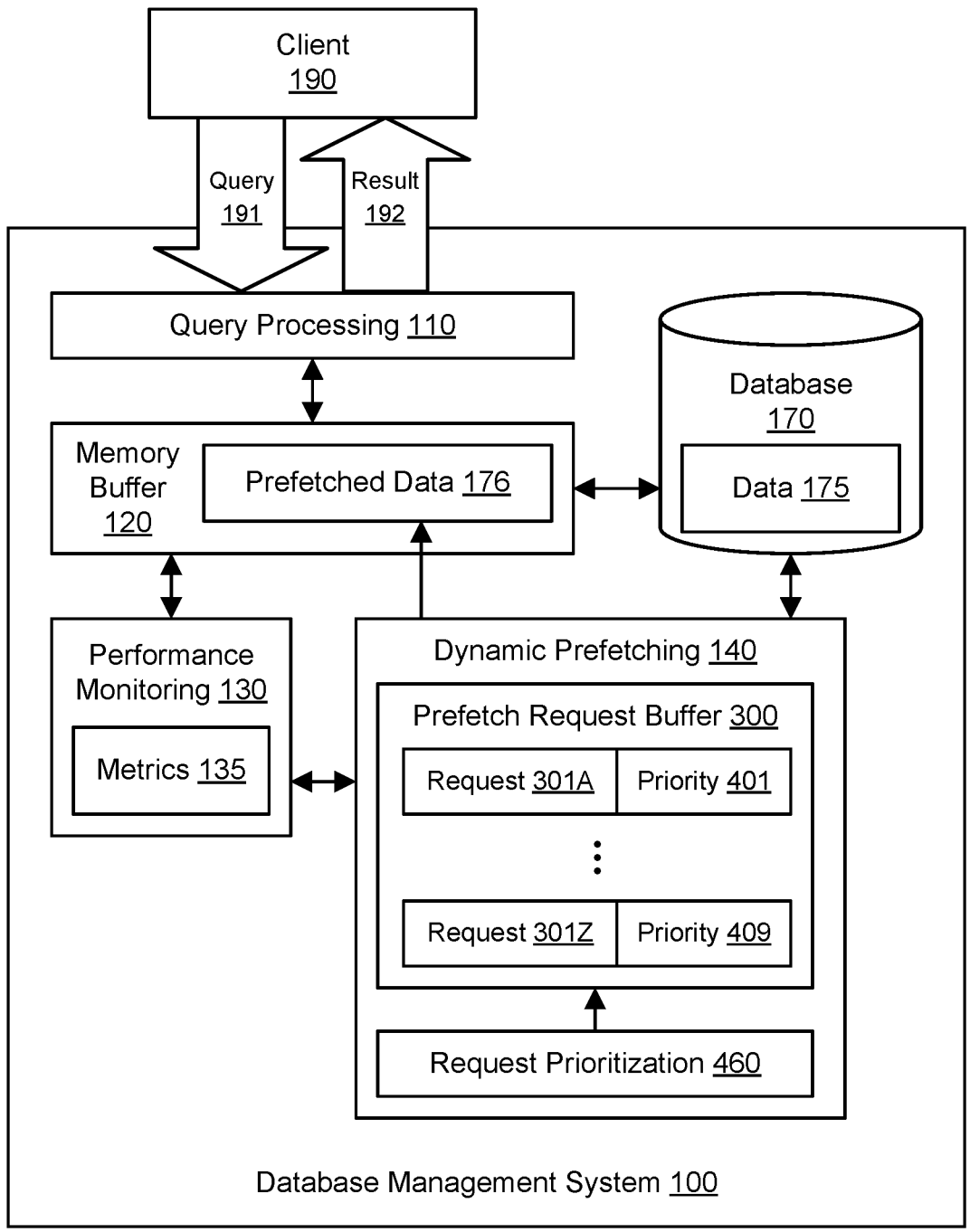
FIG. 4 illustrates further aspects of the example system environment for dynamic prefetching for database queries, including prefetch request prioritization, according to one embodiment.

FIG. 4 illustrates further aspects of the example system environment for dynamic prefetching for database queries, including prefetch request prioritization, according to one embodiment. In one embodiment, prefetch requests may be assigned priorities by a request prioritization component 460. In one embodiment, prefetch requests may be processed according to their priorities, such that requests with a higher priority will tend to be processed before requests with a lower priority. In one embodiment, for example, request 301A may have a priority 401 that is higher than a priority 409 for request 301Z, and thus the processing of prefetch request 301A may be initiated before prefetch request 301Z. In one embodiment, priorities may be assigned to prefetch requests based (at least in part) on the identity of the user submitting the query, so that particular users are not allowed to flood the prefetch subsystem 140 with excessive requests. In one embodiment, prefetch requests for a given user may be batched, and dynamic prefetching 140 may rotate from batch to batch (and user to user) so that the given user does not overload the prefetch subsystem.

Figure 5:
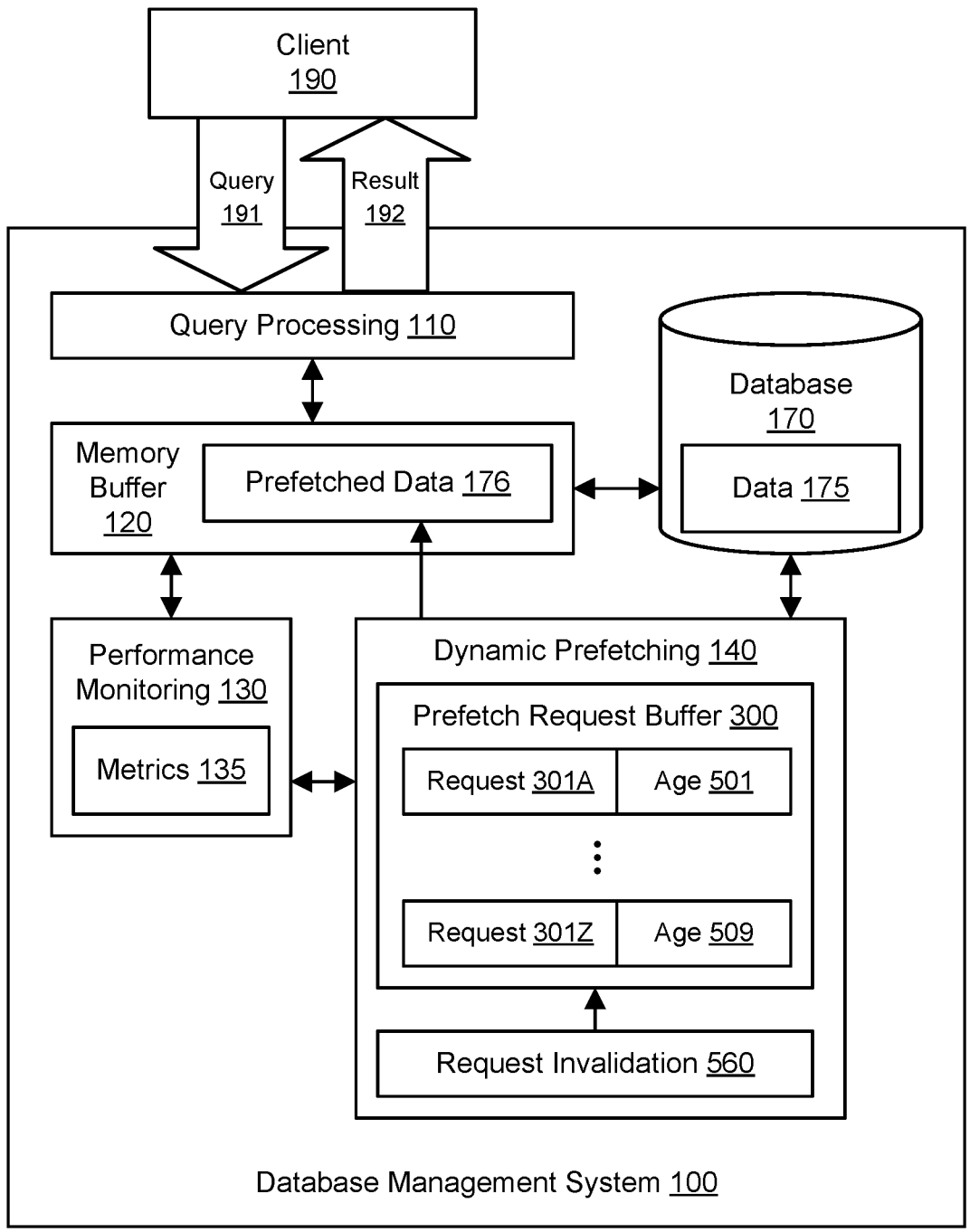
FIG. 5 illustrates further aspects of the example system environment for dynamic prefetching for database queries, including prefetch request invalidation, according to one embodiment.

FIG. 5 illustrates further aspects of the example system environment for dynamic prefetching for database queries, including prefetch request invalidation, according to one embodiment. In one embodiment, prefetch requests may be invalidated and discarded by a request invalidation component 560, such that processing for an invalidated prefetch request is not initiated. In one embodiment, prefetch requests may be invalidated based (at least in part) on suitable metadata for the requests. In one embodiment, a prefetch request may be assigned metadata such as the age of the request. In one embodiment, for example, request 301A may have an age 501 that is newer than an age 509 for request 301Z. In one embodiment, older prefetch requests for a set of underlying data may be invalidated, while newer requests for the same set of data may be kept in the request buffer 300. In one embodiment, older prefetch requests for the same table (or index) and the same query may be invalidated, while newer requests for the same table (or index) and the same query may be kept in the request buffer 300. In one embodiment, a prefetch request may be invalidated if the request is sufficiently old that the requested data has already been retrieved from the database 170 without prefetching. In one embodiment, the metrics 135 may represent the number of invalidated requests, and such metrics may be used in a feedback loop to enable, disable, or scale the dynamic prefetching. In one embodiment, the invalidating of outdated prefetch requests may be performed according to the prefetch policy 145.

Figure 6:
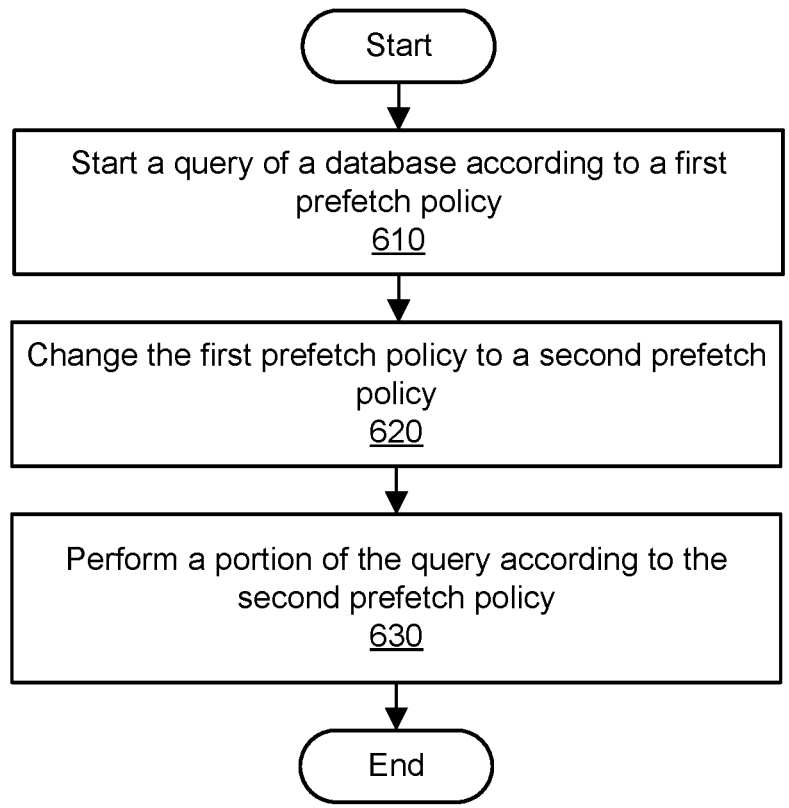
FIG. 6 is a flowchart illustrating a method for dynamic prefetching for database queries, according to one embodiment.

FIG. 6 is a flowchart illustrating a method for dynamic prefetching for database queries, according to one embodiment. As shown in 610, in one embodiment, a query of a database may be started according to a first prefetch policy. In one embodiment, the query may be received and performed in a database management system such as a relational database management system. In one embodiment, the query may be expressed in a formal language such as Structured Query Language (SQL). In one embodiment, the query may be submitted by a particular user of the database management system. In one embodiment, the query may represent an inquiry into the database, e.g., to return selected data elements stored in the database. In one embodiment, the query may represent an operation that reads a non-covering index (e.g., an index that cannot satisfy all requested columns in a query without performing a further lookup into the clustered index). In one embodiment, the query may represent a join on two or more tables, such that the output of the join may depend on rows or keys that are read for the first of the tables. In one embodiment, starting the query may include reading rows, keys, or other elements of data from a first table according to the first prefetch policy. In one embodiment, retrieved data may be stored in a memory buffer of the database management system, where the memory buffer may provide low-latency access to data needed for queries. In one embodiment, retrieving data to start the query may include retrieving one or more pages of index data using a B-tree or other data structure. In one embodiment, the pages of index data may include rows or keys needed to process the query along with adjacent rows or keys that may not be needed at the present time but that may ultimately be used for other queries or other portions of the same query.

In one embodiment, a prefetch policy may relate to a particular query or to one or more tables, indexes, or other types of datasets associated with the query. In one embodiment, a prefetch policy may indicate whether prefetching is enabled or disabled for a particular query and/or a particular dataset. In one embodiment, a prefetch policy may indicate an amount of threads, data structures, and/or other computational resources to be used for prefetching for a particular query and/or a particular dataset. In one embodiment, a prefetch policy may indicate a maximum number of prefetch requests over a given duration of time, and requests in excess of that number may be discarded. In one embodiment, a prefetch policy may indicate priorities assigned to particular prefetch requests based on suitable criteria, where requests having a higher priority are more likely to be performed while requests having a lower priority are more likely to be discarded and not performed. In one embodiment, for example, priorities may be assigned to prefetch requests based (at least in part) on the identity of the user submitting the query, so that particular users are not allowed to flood the prefetch subsystem with excessive requests. In one embodiment, prefetch requests for a given user may be batched, and dynamic prefetching may rotate from batch to batch (and user to user) so that the given user does not overload the prefetch subsystem. In one embodiment, a prefetch policy may indicate how to handle older prefetch requests, e.g., such that older requests for the same query and the same dataset may be invalidated or discarded in favor of newer requests, or so that prefetch requests may be invalidated if the need for the requested data has already passed.

As shown in 620, in one embodiment, the first prefetch policy may be changed to a second prefetch policy before completing the query. In one embodiment, changing the prefetch policy may include enabling prefetching for the query. In one embodiment, changing the prefetch policy may include disabling prefetching for the query. In one embodiment, changing the prefetch policy may include changing the amount of resources devoted to prefetching for the query, such as the number of threads or the maximum amount of prefetch requests to be accepted over a duration of time. In one embodiment, the prefetch policy may be changed based (at least in part) on automated analysis of system metrics or other status indicators in the database management system. In one embodiment, a metric may be determined that indicates the warmness of the memory buffer with respect to a particular table, and the prefetch policy may be changed for that particular table and for the particular query based (at least in part) on the metric. In some embodiments, for example, prefetching for a table may be enabled or scaled up if the amount of the table's elements in the buffer is below a threshold percentage, or prefetching for the table may be disabled or scaled down if the amount of the table's elements in the buffer is above a threshold percentage. In one embodiment, the presence of index pages for a particular index in the memory buffer may change throughout the processing of a query, e.g., as pages are pushed out by pages for other queries. In one embodiment, the prefetch policy may be changed in response to probing the memory buffer using the query itself, e.g., to determine the extent to which data elements of a particular table are already present in the buffer. In one embodiment, for example, if the hit rate in the buffer for index pages is low, then prefetching may be enabled or scaled up for a latter portion of a query based (at least in part) on changes to the content of the memory buffer after the processing of the query was initiated. In one embodiment, by changing the prefetch policy during the processing of a particular query, prefetching can be triggered selectively for some indexes and not for other indexes in order to optimize resource use.

In one embodiment, the prefetch policy may be changed based (at least in part) on metrics for system performance such as processor usage, memory usage, input/output (I/O) latency, and so on. In one embodiment, for example, if system performance (as captured in one or more metrics) has decreased below an acceptable threshold after instituting the first prefetch policy, then prefetching may be disabled or scaled down using the second prefetch policy. In one embodiment, if memory buffer thrashing is detected, then prefetching may be disabled or scaled down using the second prefetch policy. In one embodiment, if performance was improved by a change reflected in the first prefetch policy, then that change may be further implemented in the second prefetch policy. In one embodiment, for example, a performance improvement resulting from an increase in prefetch requests or prefetch threads in the first prefetch policy may result in a further increase in prefetch requests or prefetch threads in the second prefetch policy. In one embodiment, the prefetch policy may be changed based (at least in part) on a metric for the number or frequency of invalidations of older prefetch requests. In one embodiment, the prefetch policy may be changed based (at least in part) on a metric for the number or frequency of page misses on the query thread. In one embodiment, the prefetch policy may be changed based (at least in part) on a metric for the number or frequency of prefetch requests discarded due to resource constraints. In one embodiment, for example, the maximum number of prefetch requests may be decreased in response to a high number of discarded requests. In one embodiment, if metrics show that prefetching is being performed frequently for pages that are already in the memory buffer, or for pages that are evicted from the buffer before the query can use them, then prefetching may be disabled or scaled down for that particular index.

As shown in 630, in one embodiment, a portion of the query may be performed according to the second prefetch policy. In one embodiment, performing the portion of the query may include prefetching elements of data, e.g., if the second prefetch policy enables prefetching for the particular table, index, or other dataset. In one embodiment, prefetched elements of data may be retrieved and then stored in a low-latency memory buffer to which the query processer has access. In one embodiment, prefetched data may include pages of index data retrieved using a B-tree or other data structure. In one embodiment, the pages of index data may include rows or keys needed to process the query along with adjacent rows or keys that may not be needed at the present time but that may ultimately be used for other queries or other portions of the same query. In one embodiment, prefetched data may be retrieved and stored in the buffer before a specific need to use the data is encountered in processing the query. In one embodiment, for example, to perform a join on two tables, rows containing keys may be read from the first table (according to the first prefetch policy), and those keys may be used to prefetch rows from the second table before the query processor performs the portion of the query statement that requires the data from the second table. In one embodiment, the prefetched rows may be available in memory when the query needs them, and thus the query may be processed more quickly without the need to wait for additional I/O of data from the database.

In one embodiment, the portion of the query may be performed without prefetching elements of data, e.g., if the second prefetch policy disables prefetching for the particular table, index, or other dataset. In one embodiment, performing the portion of the query may include prefetching elements of data using threads from a pool of threads associated with prefetching, where the number of threads in the pool is determined according to the second prefetch policy. In one embodiment, performing the portion of the query may include prefetching elements of data based on one or more prefetch requests, where the maximum number of prefetch requests is determined according to the second prefetch policy.

In one embodiment, a particular index associated with a query may be decomposed into a set of leaf nodes in a B-tree, where a leaf node represents a page with multiple rows of index data, and where a leaf node can be found by navigating from the root node of the tree through one or more levels of intermediate nodes. In one embodiment, prefetch requests belonging to the same page may be batched for particular levels on the B-tree that represents pages of index data, in order to take advantage of spatial locality of the requested data. In one embodiment, the B-tree may be navigated in an efficient manner such that the same path need not necessarily be traversed multiple times over a short duration of time. In one embodiment, the B-tree may be navigated asynchronously with respect to I/O tasks and other tasks involved in query processing. In one embodiment, requests to navigate the B-tree may be non-blocking so that other tasks involved in query processing are allowed to proceed while the B-tree is navigated.

In one embodiment, joins on large datasets may be resource-intensive, especially in terms of input/output (I/O), because the working set may not necessarily be in memory. In one embodiment, although prefetching into a low-latency memory buffer may be used to speed up query processing, excessive use of prefetching may result in technical problems such as memory buffer thrashing and resource exhaustion. In some embodiments, dynamic prefetching as described herein may provide one or more of the following technical advantages: reduction in the performance impact of I/O latency in a database management system, faster use of computing resources to process database queries, more efficient use of memory resources to process database queries, improved scalability for queries involving large datasets, and so on. In one embodiment, for example, dynamic prefetching as described herein may improve the latency for certain types of queries (e.g., joins and non-covering index reads) by about 1000% when using a cold memory buffer.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   storage for a database;
   one or more processors; and
   memory to store computer-executable instructions that, if executed, cause the one or more processors to implement a database system configured to:
   start prefetching, into a memory buffer, elements of a first table of the database from the storage according to a first prefetch policy to process a query, wherein the query is associated with the first table and a second table of the database, and wherein the first prefetch policy indicates one or more amounts of computational resources for prefetching the elements of the first table of the database for the query;
   access, from the memory buffer, a portion of the elements of the database prefetched according to the first prefetch policy to perform the query;
   change the first prefetch policy to a second prefetch policy, wherein responsive to changing the first prefetch policy to the second prefetch policy the database system is configured to modify the prefetching to use one or more other amounts of computational resources before completing the prefetching, wherein the one or more other amounts of computational resources are indicated by the second prefetch policy and are different from the one or more amounts of computational resources indicated by the first prefetch policy; and
   access, from the memory buffer, another portion of the elements of the database prefetched according to the second prefetch policy to complete the query, wherein elements of the second table are prefetched using the one or more other amounts of computational resources according to the second prefetch policy.

2. The system as recited in claim 1, wherein, in changing the first prefetch policy to the second prefetch policy, a number of threads usable to perform prefetching is modified based at least in part on one or more metrics, and wherein the elements of the second table are prefetched according to the second prefetch policy and using at least some of the threads.

3. The system as recited in claim 1, wherein, in changing the first prefetch policy to the second prefetch policy, prefetching is enabled for the second table based at least in part on one or more metrics.

4. The system as recited in claim 1, wherein, in changing the first prefetch policy to the second prefetch policy, prefetching is disabled for the second table based at least in part on one or more metrics.

5. A method, comprising:
   starting prefetching from storage, into a memory buffer, elements of a database according to a first prefetch policy indicating one or more amounts of computational resources for prefetching the elements of the database;
   accessing, from the memory buffer, a portion of the elements of the database prefetched according to the first prefetch policy to query the database;
   changing the first prefetch policy to a second prefetch policy comprising modifying the prefetching to use one or more other amounts of computational resources indicated by the second prefetch policy before completing the prefetching, wherein the one or more other amounts of computational resources indicated by the second prefetch policy are different from the one or more amounts of computational resources indicated by the first prefetch policy; and
   accessing, from the memory buffer, another portion of the elements of the database prefetched using the one or more other amounts of computational resources according to the second prefetch policy to complete the query of the database.

6. The method as recited in claim 5, wherein the query is associated with a first table and a second table, wherein changing the first prefetch policy to the second prefetch policy comprises modifying an amount of computing resources associated with prefetching, and wherein elements of the second table are prefetched according to the second prefetch policy and using at least some of the computing resources.

7. The method as recited in claim 5, wherein the query is associated with a first table and a second table, and wherein changing the first prefetch policy to the second prefetch policy comprises enabling prefetching for the second table.

8. The method as recited in claim 5, wherein the query is associated with a first table and a second table, and wherein changing the first prefetch policy to the second prefetch policy comprises disabling prefetching for the second table.

9. The method as recited in claim 5, further comprising:
   determining a metric associated with a memory buffer usable to store prefetched elements of the query, wherein the first prefetch policy is changed to the second prefetch policy based at least in part on the metric.

10. The method as recited in claim 5, wherein the query is associated with a first index and a second index, and wherein performing the portion of the query according to the second prefetch policy comprises prefetching pages of the second index.

11. The method as recited in claim 5, wherein the query comprises a join of a first table and a second table, wherein elements of the second table are identified using elements retrieved from the first table, and wherein the elements of the second table are prefetched according to the second prefetch policy.

12. The method as recited in claim 5, wherein performing the query comprises retrieving elements of a non-covering index.

13. A non-transitory computer-readable storage medium to store program instructions that, if executed, cause one or more processors to perform:
  initiating prefetching from storage, into a memory buffer, elements of a database according to a first prefetch policy indicating one or more amounts of computational resources for prefetching the elements of the database;
  accessing, from the memory buffer, a portion of the elements of the database prefetched according to the first prefetch policy to query the database;
  modifying the first prefetch policy to a second prefetch policy comprising changing the prefetching to use one or more other amounts of computational resources before completing the prefetching, wherein the one or more other amounts of computational resources are indicated by the second prefetch policy and are different from the one or more amounts of computational resources indicated by the first prefetch policy; and
  accessing, from the memory buffer, another portion of the elements of the database prefetched using the one or more other amounts of computational resources according to the second prefetch policy to complete the query of the database.

14. The non-transitory computer-readable storage medium as recited in claim 13, wherein the query is associated with a first index and a second index, wherein modifying the first prefetch policy to the second prefetch policy comprises modifying an amount of computing resources associated with prefetching based at least in part on one or more metrics, and wherein elements of the second index are prefetched according to the second prefetch policy and using at least some of the computing resources.

15. The non-transitory computer-readable storage medium as recited in claim 13, wherein the query is associated with a first index and a second index, and wherein modifying the first prefetch policy to the second prefetch policy comprises enabling prefetching for the second index based at least in part on one or more metrics.

16. The non-transitory computer-readable storage medium as recited in claim 13, wherein the query is associated with a first index and a second index, and wherein modifying the first prefetch policy to the second prefetch policy comprises disabling prefetching for the second index based at least in part on one or more metrics.

17. The non-transitory computer-readable storage medium as recited in claim 13, wherein the program instructions, if executed, cause the one or more processors to perform:
  determining a metric associated with a memory buffer usable to store prefetched elements of the query, wherein the first prefetch policy is changed to the second prefetch policy based at least in part on the metric.

18. The non-transitory computer-readable storage medium as recited in claim 13, wherein performing the portion of the query according to the second prefetch policy comprises prefetching elements associated with the query, wherein the elements are indicated in a prefetch request, and wherein the prefetch request is assigned a priority relative to other prefetch requests.

19. The non-transitory computer-readable storage medium as recited in claim 18, wherein one or more other prefetch requests associated with the query are discarded based at least in part on an older age of the one or more prefetch requests.

20. The non-transitory computer-readable storage medium as recited in claim 13, wherein modifying the first prefetch policy to the second prefetch policy comprises modifying a maximum number of prefetch requests to perform over a period of time.

* * * * *